Patented Dec. 31, 1946

2,413,320

UNITED STATES PATENT OFFICE 2,413,320

FILM FORMING EMULSIONS

Ira L. Griffin, Dave E. Truax, and Norman H. Nuttall, Charlotte, N. C., assignors to Stein, Hall and Company, Inc., New York, N. Y., a corporation of New York No Drawing. Application May 14, 1942, Serial No. 442,992

34 Claims. (Cl. 106—208)

This invention relates to film forming compositions and to the application of such compositions to various types of materials to increase the permanency and resistance to water thereof. In one of its preferred applications the invention relates more particularly to the art of coloring textile materials and especially to the art of textile printing.

As is well known, various procedures have heretofore been used or attempted in order to form water resistant or water insoluble films on various types of articles or materials such as, for example, textile materials. Synthetic resins have been widely used for this purpose. For the most part, the use of such resins has involved either the application of the resin in a water dispersed form followed by heating in the presence of a catalyst to develop water resistance after the water dispersed form has been applied to the article or material, or the addition of the resin dissolved or dispersed in an organic solvent. Some of these proposed methods and compositions have been successful, others moderately successful and still others have left much to be desired. Among some of the disadvantages of previously proposed methods and compositions for imparting water resistance or permanency to various types of materials have been the relatively high cost of the treating agents, fire hazards, odors and high temperatures required in drying the various types of articles after they have been treated. In a number of instances, the scarcity of the treating agents for the results obtained have not justified the treatment commercially.

In the art of textile printing, among the more recent developments has been the introduction of a textile printing paste consisting of emulsions in which an outer continuous water-immiscible-lacquer phase is thickened by an inner aqueous phase which is at least 20% of the total emulsion by weight. The binder for the pigment or dye in such printing pastes is normally one which is originally soluble in ordinary organic solvents, for example, a synthetic resin such as urea-formaldehyde resin. Another and more common type of textile printing heretofore regarded as conventional has involved the use of water solutions or dispersions of dyes containing water soluble thickening agents, for example, starches, gums and the like, in sufficient quantity to retard the spreading of the color on the fabric after printing. In this type of printing paste the dye must be fixed to the fiber or the material being treated by some chemical method, because the binder or thickening agent being water dispersible is washed out after the treatment. Attempts to modify this latter type of paste by the addition of wetting agents and emulsification of oils therein have not solved many of the more difficult problems which arise with the use of such pastes. A third method of printing which we have proposed involves the use in printing pastes as thickening agents or binders water dispersible, film forming carbohydrate materials of the type hydrolyzable by acids to simpler molecular compounds, including, for example, starches, gums and the like, together with the addition of an auxiliary agent comprising an antimony compound reactive with the water soluble binder, whereby the binder is converted into an insoluble state after printing and drying. Printing pastes of this type have a number of advantages of both of the other types of printing pastes previously mentioned without some of the disadvantages of these other types of printing pastes.

In so far as is known, the emulsion types of printing pastes containing a water-immiscible-lacquer phase thickened by an aqueous phase have not embodied in the aqueous phase a water dispersible film forming binder, but on the contrary have avoided the use of such a binder in the aqueous phase upon the assumption that the presence of such a binder is undesirable. One reason given for the absence of a binder in the water phase in the lacquer emulsion type of printing pastes is that the emulsion is better able to penetrate the fabric.

One of the objects of the present invention is to provide a new and improved emulsion type of film forming composition which can be applied to various types of materials and after being dried thereon imparts increased water resistance, permanency of finish and other properties where water resistance is a factor.

Another object of the invention is to provide a new and improved type of printing paste containing a binder in the aqueous phase.

An additional object is to provide a new and improved type of printing paste containing as a binder in the aqueous phase a water dispersible, film forming carbohydrate material hydrolyzable by acids to simpler molecular compounds and a fixing agent comprising an antimony compound reactive with said carbohydrate material to render the same water insoluble upon dehydration.

Further objects of the invention are the preparation of printing pastes which give especially smooth prints, even coverage, good reproduction of fine lines, improved flow and more resistance to washing.

Another object of the invention is to provide new and improved methods of forming water insoluble films on various types of materials.

Still a further object of the invention is to provide new and useful improvements in the art of textile printing and especially in the art of pigment printing wherein a pigment dye is held on the fiber by a water insoluble, film forming carbohydrate material converted from its water soluble form by reaction with an antimony compound.

More specific objects of the invention are the preparation of new and improved oil-in-water emulsion types of printing pastes containing a binder in the aqueous phase. Other objects will appear hereinafter.

In accomplishing these objects in accordance with this invention, we have found that new and useful results in the application of film forming materials to various types of articles or objects, more particularly textiles, are obtained by the preparation of emulsions consisting of an oil or organic solvent phase and a water or aqueous phase in which the water or aqueous phase contains a water dispersible, film forming carbohydrate material hydrolyzable by acids to simpler molecular compounds, and a fixing agent comprising an antimony compound reactive with said carbohydrate material to render said carbohydrate material water insoluble by dehydration after the film forming composition has been applied. Especially good results have been obtained with emulsions of the oil-in-water type where the water is the outside phase.

In accordance with the preferred practice of the invention, two different types of emulsions may be employed. In the first type of emulsion, the binder is in the aqueous phase. It preferably consists of any water dispersible, film forming carbohydrate material of the type described, or a synthetic material resembling a carbohydrate in many of its properties, as for example, a starch, a starch degradation product, a natural gum, a polyvinyl alcohol, a mixture of a natural gum and a starch, and/or a mixture of a starch or starch product with a polyvinyl alcohol combined with an insolubilizing metallic salt such as, for example, potassium pyroantimonate. This binder is preferably prepared by mixing it with water and heating until the mix is clear, then cooling and adding a small amount of an emulsifying agent. The oil or solvent phase is preferably prepared by dispersing an emulsifying agent in a suitable oil or solvent. The two phases preferably in approximately equal proportions are then homogenized and the emulsion is formed. This emulsion may be applied as a coating or impregnating composition for various types of articles or objects and may be used as a printing emulsion merely by stirring a suitable color or pigment into the emulsion. The viscosity of the emulsion may be varied by varying the proportions of the various materials.

A second type of emulsion which represents one of the preferred embodiments of the invention is prepared similarly to that previously described in so far as the water phase is concerned, but the oil or solvent phase, instead of consisting of a solvent and emulsifying agent alone also contains a solvent soluble resin or binder, preferably in amounts from about ¼% to 10%, or even higher. The two phases are prepared in the same manner as when there is no binder in the oil phase. The color or pigment is likewise added after the emulsion has been prepared. The proportions of oil and water may vary depending upon the particular application and upon the body or consistency of emulsion desired.

A third type of emulsion which may be prepared in accordance with the invention is an emulsion of the water-in-oil type containing the binder in the aqueous phase, as more fully hereinafter described.

The invention will be further illustrated but is not limited by the following examples in which the quantities are stated in parts by weight, unless otherwise indicated.

*Example 1*

This is an example of the preparation of an emulsion containing a water dispersible, film forming material and an antimony fixing compound in the aqueous phase with no binding agent in the water immiscible phase.

A dry base is prepared by mixing together on a weight basis the following ingredients:

| | Per cent |
|---|---|
| Modified starch | 96 |
| Natural gum | 1 |
| Potassium pyroantimonate | 3 |

After these ingredients are thoroughly blended, they are mixed with water in the approximate proportion of 7 ounces of blend per gallon of water, and the mixture is cooked until it is clear (approximately 170° F.). The mixture is then allowed to cool and 1% by volume of an emulsifying agent, for example, Dupanol ME (sodium lauryl sulfate) is added. This constitutes the aqueous phase.

The oil or solvent phase is prepared by dispersing an emulsifying agent in a suitable oil or solvent, for example, 1% by volume of Alkanol WXN in Varsol or Solvesso #2.

Fifty (50) parts by weight of the aqueous phase are then homogenized with 50 parts by weight of the oil or solvent phase until an emulsion is formed.

This emulsion is applied as a coating to previously dyed materials, or it is used directly as a printing paste by adding a suitable dye, for instance, by the addition of 10 parts by weight of Aridye SX Green B.

This printing paste is used for printing on textiles, for example, cotton fabric, by applying it from a metal roll or other suitable method of application. After the fabric is printed, the print is dried to a moisture content of less than about 3% by weight.

The prints which are obtained in this manner are smooth, provide even coverage of the dye and good reproduction of fine lines. The paste characteristics of the printing paste are particularly improved with respect to the flow of the paste.

The viscosity of the emulsion may be varied by varying the proportions of binder, water and oil or organic solvent. It will be understood that a variation in the viscosity is desirable in some instances to conform with varying printing practices in different printing plants. If the emulsion is applied with or without the dye for coating or impregnating, it is usually preferable to employ a lower viscosity emulsion and the method of application may vary rather widely. Thus, a textile fabric may be coated or impregnated by immersion, dipping, spraying and other similar methods. The temperature of drying after the treatment of the fabric or other articles with the emulsion may vary rather widely, but is preferably around 240° F. to 300° F., and in order to obtain the best results with regard to permanency of finish, it is preferable to dry the treated object or article until the moisture content of the applied film is less than about 3%. Where less permanency of finish is desired or where permanency of the applied coating is not a factor, higher percentages of moisture may be allowed to remain in the applied film.

*Example II*

This example is given to illustrate the preparation of an emulsion of the oil-in-water type in which a binder is used in both the oil and the aqueous phase.

The aqueous phase in this case is prepared exactly as in Example I, but the oil phase, instead of consisting of a water immiscible organic solvent or oil and an emulsifying agent alone, also contains a substantial amount of a binder which is soluble in the organic solvent and exists in an insoluble state or can be converted into an insoluble state after printing or otherwise applying the emulsion. The binder in this case preferably comprises from approximately ¼% to 10% or even higher of a film forming organic solvent soluble compound which is substantially insoluble in water or can be converted to a substantially water insoluble state after being applied, for example, cellulose derivatives such as cellulose ethers (e. g. ethyl cellulose), cellulose esters (e. g. cellulose acetate, cellulose proprionate) and resins, for example, heat polymerizable synthetic resins, as exemplified by plasticized urea-formaldehyde resins, alkyd resins, and the like.

Fifty (50) parts of the aqueous phase prepared as in Example I, containing 7 ounces per gallon of the dry blend of water dispersible binder described in Example I, and 1% by volume of Dupanol ME are homogenized with 50 parts of a 5% by weight solution of a low viscosity ethyl cellulose in Solvesso #2 containing 1% by volume of Alkanol WXN as an emulsifying agent. Ten (10) parts of Aridye SX Green B are then added to the emulsion by stirring and the emulsion is ready to print.

In printing on textiles, the emulsion of this example is applied in the same way and the prints are dried in the same manner as described in Example I. The prints prepared in accordance with this example have all of the advantages of those prepared in accordance with Example I, together with increased resistance to washing.

The emulsions prepared in accordance with this example may be varied in body or consistency by varying the proportions of oil and water. These emulsions may also be employed, with or without the dye, for coating, impregnating and otherwise applying or forming films resistant to water on textiles or other materials, articles or objects.

*Example III*

This example is given to illustrate the preparation of an emulsion of the water-in-oil type in which a binder is used in the aqueous phase.

The oil phase of the emulsion was prepared by adding 480 lbs. of copper naphthenate to 1400 lbs. of Varsol. The aqueous phase was prepared by mixing 4000 lbs. of an aqueous binder of the type described in Example I made up on the basis of ½ lb. of the dry blend per gallon of water, with 40 lbs. of Modinal D (Procter and Gamble). The two phases were emulsified to form an oil-in-water emulsion. A water immiscible solvent dispersed pigment dye containing 22% of an oil soluble resin (Aridye DX color) was then added in amounts comparable to those used in Example I, and during the addition the emulsion was reversed to a water-in-oil type with the pigment in the oil phase. The resin acts as a water-in-oil emulsifier. The Varsol is a hydrocarbon. Modinal D is an emulsifying agent. Copper naphthenate is employed chiefly as a mildew proofing agent although it assists as an emulsifying agent. This was used in printing on camouflage material, and the results were quite satisfactory.

In the foregoing examples, Dupanol ME is a sodium salt of a sulfated fatty alcohol (Du Pont), Alkanol WXN is a sodium sulfonate of a hydrocarbon (Du Pont), Solvesso #2 is a hydrogenated petroleum solvent with a boiling range from about 135° C. to about 177° C. (Standard Oil of New Jersey), and Solvesso #3 is a hydrogenated petroleum solvent boiling around 190° C. to 215° C.

Other specific pigment dyes which may be mentioned and which may be used instead of the SX Green B are:

Monastral Green B  
Monastral Blue BF } E. I. Du Pont  
Lithosol Pink  
Red iron oxide } Ciba Company  
Yellow ochre It will be understood that the foregoing examples are given by way of illustration only and are not intended to limit the invention to the particular ingredients described.

As previously stated, the water dispersible binder employed in the aqueous phase of the emulsion is a film forming carbohydrate material of the type hydrolyzable by acids to simpler molecular compounds, preferably a starch, a starch degeneration product, a natural gum, and/or a polyvinyl alcohol. Generally speaking, it is preferable to employ a starch or a starch degeneration product as the major component of the water dispersible binder on a dry basis. By a starch degeneration product is meant a derivative of starch such as may be obtained by the various processes for making thin boiling and so-called modified starches and dextrines. In general, especially good results have been obtained with specially modified starches. Enzyme modified starches and chlorinated or oxidized starches may be employed, including "thin boiling" starches. If desired, mixtures of undegenerated and degenerated starches may be used. Likewise, mixtures of starches, either undegenerated or degenerated, with natural gums may be employed, or mixtures of starch, either undegenerated or degenerated, with polyvinyl alcohol may be used. Starch degeneration products of a predominantly starchy nature are preferable to the more highly dextrinized starches, because after a certain degree of disorganization of the starch, it usually requires a much larger percentage of the fixing agent, e. g., a water soluble pyroantimonate, to bring about fixation, water insolubilization or a hydrophobic state of the starch. Among the suitable starchy materials may be mentioned those derived from wheat, rye, barley, oat, rice, corn and potato starches, sago and cassava flours, and colloidal modifications thereof, and other starches and flours and derivatives thereof.

Among the natural gums which may be employed may be mentioned particularly locust bean gum, gum tragacanth and other water dispersible film forming natural gums.

Of the water dispersible synthetic film forming substances resembling carbohydrates in many of its properties, special mention is made of polyvinyl alcohol.

Polyvinyl alcohol is a water-white, resin-like material usually obtained by the hydrolysis of polymerized vinyl esters, such as, polyvinyl acetate. Polyvinyl alcohol can be made in a number of modifications of various degrees of polymerization, the degree of polymerization depending largely upon the extent to which the final compound, from which it is made, has been polymerized. All of the modifications are soluble in water to some extent, the more highly polymerized being less easily dissolved and producing solutions of a higher viscosity. A number of so-called partial derivatives of polyvinyl alcohol can be prepared in which some of the hydroxyl groups in the molecule are replaced with other radicals such as, for example, ester radicals. The properties of the partial derivatives of polyvinyl alcohol vary with the proportion of hydroxyl radicals substituted by other groups. When the hydroxyl radicals predominate, the partial derivatives have substantially the properties of polyvinyl alcohol. The term "polyvinyl alcohol" as used herein, therefore, also includes such partial derivatives as contain a sufficient number of unsubstituted hydroxyl groups to make the composition soluble or dispersible in water.

The water insolubilizing or fixing agents for the water dispersed binder material, for the purpose of the present invention, are preferably antimony compounds capable of converting water dispersible polyhydroxylated film forming substances of the type described from a hydrophilic to a hydrophobic state. The antimony compounds which have been found to be especially suitable are those in which antimony is present in its pentavalent state. Certain antimony compounds are of less value for the purpose of the invention, as, for example, antimonous oxide ($Sb_2O_3$) and sodium antimonate. These two compounds are better when freshly precipitated. Tartar emetic has some effect when employed under alkaline conditions. Larger amounts of the tri-valent antimony compounds are normally required.

Of the fixing agents, potassium pyroantimonate is of principal importance. It occurs in two modifications, namely, the acid salt ($K_2H_2Sb_2O_7$) and the neutral salt ($K_4Sb_2O_7$). Up to the present time the material which is available commercially is what is called "re-agent material" which is largely acid salt, although it contains some neutral salt. Antimonic oxide ($Sb_2O_5$) may also be employed as the fixing agent. A product obtained by dissolving antimony metal in excess concentrated nitric acid which was apparently the acid $H_3SbO_4$ also acted as a fixing agent. It was further observed that when potassium pyroantimonate and antimony trifluoride were mixed together or when potassium pyroantimonate and antimony lactate were mixed together, the resultant precipitate could be employed as a fixing agent for the water soluble film forming component of the composition.

The carbohydrate binder may contain a thinning agent, a plasticizing agent, or other auxiliary agent for a specific purpose. Thinning agents capable of thinning the binders are sometimes desirable in order to decrease their viscosity in aqueous dispersions. They may also be of advantage to prevent jelling or too rapid reaction by the fixing agent on the water dispersed binder. Salts or other compounds having a thinning or gelatinizing action on the carbohydrate material may be employed. It is usually preferable that the nature of the salt or other compound and the quantity thereof be such that the aqueous phase has a pH not less than about 2.5 and does not develop a pH greater than about 10.

Among the salts or other compounds which may be employed are, for example, sodium silico fluoride, antimony trifluoride, ammonium oxalate, sodium perborate, sodium persulphate, citric acid, lactic acid and acetic acid. Enzymes may also be added to produce a thinning action. Some of these salts, such as, for example, antimony trifluoride, have some fixing value of their own when used as auxiliary agents, and it is, therefore, more advantageous to use these as thinning agents. Others, such as ammonium oxalate, are illustrative of salts which become acidic on heating. Other salts, such as sodium perborate and sodium persulphate, derive their thinning action from their oxidizing properties. The free acids, such as citric acid, lactic acid and acetic acid are capable of thinning starches without breaking them down too much.

If the pH is too low, the starch may be broken down so much as to require a relatively large amount of the fixing agent. Likewise, the strongly acidic condition may adversely affect the cloth on which the mix is being applied. If the pH is too high, the desired fixing action either does not occur or is greatly reduced, particularly as to the pentavalent antimony compounds. The latter are more reactive on the acid side while some of the trivalent antimony compounds, such as tartar emetic, seem to have only a relatively small amount of fixing action as compared with the pentavalent antimony compounds and this only on the alkaline side.

In general the pH of the emulsions prepared in accordance with the invention is preferably not substantially higher than 7, that is to say, the emulsions are preferably substantially non-alkaline.

In the oil or solvent phase of the emulsion the oil or solvent must be chosen to be compatible with certain other ingredients of the emulsion. A volatile solvent should be used, or at least a solvent which is sufficiently volatile so that it can be removed by heating or drying the treated article or material to which the film forming composition has previously been applied. If a pigment dye or dye component is present in the emulsion, as, for example, where the emulsion is used as a printing paste, then the organic solvent should be one which does not have a solvent action upon the pigment dye or dye component. As a general rule, among the water immiscible solvents the aliphatic hydrocarbons and hydrogenated petroleum hydrocarbons have no effect on dyes. Certain of the lower aromatic hydrocarbons are also satisfactory, including benzene, toluene and the xylenes (xylol). Certain of the terpenes can also be used. The alcohols and esters are more likely to have a solvent action upon the dyes, but in certain cases these can also be used, provided a test shows that they do not affect the particular dye which is being employed in the emulsion.

A wide variety of emulsifying agents can be employed in the aqueous and oil phases of the emulsions. Particular mention may be made of the aliphatic long chain carbon compounds containing 8 to 30 carbon atoms, together with one or more sulphuric ester or sulphonic acid groups as exemplified, for instance, by sodium lauryl sulfate. It will be understood that the invention is not limited to the use of any particular emulsifying agent.

If the oil or organic solvent phase is to contain a binder solute, as illustrated by Example II, it will be understood that the invention is not limited to any particular binder. The binder should be one which does not have a solvent action on any dye or dye component present in the emulsion, or which is to be added to the emulsion. Generally speaking, the cellulose esters and ethers may be employed because they have a solvent action on very few dyes. Ethyl cellulose is a preferred type of binder. Among other binders which may be used are cellulose acetate, nitrocellulose, rubber and rubber derivatives, including, for example, chloroprene polymers, butadiene derivatives and other linear rubbery aliphatic polymers. With some dyes, polymerized olefine hydrocarbon resins can be used. Natural resins such as gum dammar and other natural resins may be employed. Certain bodied fatty oils can also be used. Resins derived from aromatic hydrocarbons such as the cumarone-indene type likewise can be employed in certain instances where they do not have a solvent action on the particular type of dye being dispersed. The same is true with respect to the oxygen-containing synthetic resins, including, for example, the alkyd resins (glycerol-phthalic anhydride), phenolic (phenol formaldehyde) and urea (urea-formaldehyde). It will be observed that the binders fall in several general classes, including those which form water insoluble films after the evaporation of the solvent and those which are converted into an insoluble state by heat polymerization. Certain of the resins may be plasticized with fatty oils and various chemical plasticizers which are water immiscible in accordance with conventional practice in the preparation of lacquers. Hence, the oil or organic solvent phase may contain various plasticizers in addition to the solvent and the binder.

Practically all types of dye and dye components can be incorporated into the emulsions prepared in accordance with this invention. Any of the known pigment types of dyes may be employed, including vat dyes, Heliogen, Lithosol colors and Monastral colors. The latter type of dye is known technically as a phthalocyanine dye and has a very high tinctoral power as well as excellent fastness to light. The invention is also applicable to printing and dyeing operations with dyes other than the pigment types of dyes, including leuco forms of vat dyes (e. g. sulfuric esters) and stabilized mixtures of diazo compounds and naphthol coupling components which are stabilized against reaction in aqueous alkaline solution by various methods, but are adapted to be coupled on the fabric, such as Rapidogen (General Dyestuff) and Diagen (Du Pont). These dyes are ordinarily stabilized against reaction in aqueous alkaline solution but are readily converted to reactive components in the presence of an acid medium. This class of dyes includes those in which the diazo component may be, for example, a nitrosamine or a water soluble diazoimino compound. The coupling component may be a suitable naphthol or a naphthoic acid derivative. The coupling component may be impregnated into the fabric which is to be printed or dyed, in which case the printing or dyeing emulsion contains the diazo component. In this latter instance the diazo component may be the active diazo salt rather than a derivative thereof. It will be apparent that the invention is applicable to many other dyeing and printing operations so long as the dye or dye component is compatible with the emulsion.

The emulsification may be accomplished by the use of a colloid mill, or any other suitable mechanical means.

The proportions and concentrations of the various ingredients of the film forming emulsions prepared in accordance with this invention may vary rather widely, depending upon the type of treatment and upon the type of article being treated, as well as upon other related factors. As a general rule, the water soluble binder will constitute a minor proportion of the aqueous phase of the emulsion and likewise a minor proportion of the complete emulsion. Likewise, if a resin or other solvent soluble binder is employed in the oil or solvent phase of the emulsion, it will normally constitute a minor proportion thereof, as well as a minor proportion of the emulsion as a whole. The fixing agent for the water soluble or water dispersible film forming binder will normally constitute not only a minor proportion of the aqueous phase of the emulsion, but also a minor amount as compared to the total quantity of the water soluble binder. Similarly, the emulsifying agent added to the aqueous phase of the emulsion will constitute a minor proportion thereof, as well as a minor proportion of the entire emulsion. The same is true with respect to any emulsifying agent added to the oil or solvent phase. As previously indicated, the relative proportions of water and oil or solvent may vary, depending upon the use to which the emulsion is put, the article or material treated, the coatweight of the film desired, and other factors. The relative proportions of water and water immiscible liquid may be approximately equal, as illustrated by the examples of printing pastes, or the amount of water may be greater than or less than the amount of solvent so long as a stable emulsion results.

The amount of the antimony compound, as, for example, potassium pyroantimonate, is preferably within the range of about 0.25% to about 25%, based upon the weight of the film forming carbohydrate component of the composition, or upon the total weight of a plurality of such components if more than one is used. Thus, with locust bean gum, good results can be obtained with, say, 1% potassium pyroantimonate based on the weight of the gum, while with a highly soluble dextrine, it may be desirable to employ as much as 25% of the potassium pyroantimonate. The potassium pyroantimonate or other antimony fixing agent can also be applied directly to the article or material being treated in a separate phase from the emulsion, for example, in the form of an aqueous solution, in which case the amount thereof is preferably within the range of about 0.01% to about 2%, based on the total weight of the solution.

After the film forming emulsion has been applied, the reaction between the water dispersible carbohydrate film forming substance and the fixing agent therefor is preferably effected by drying the article or material to which the emulsion has been applied at a temperature of 180° F. or higher, prior to the time that the moisture contained in the emulsion is lost or reduced materially. The fixation, permanency or insolubility of the film is enhanced by drying it to a substantially low moisture content, preferably below about 5%, and more desirably below about 3% by weight of moisture. If the oil phase of the emulsion contains a heat polymerizable film forming substance or a film forming substance which is thermoplastic, the drying operation that fixes the water soluble film forming substance also brings about fixation and/or penetration of the solvent soluble film forming substance.

Although the invention has been described with reference to certain special types of water soluble or water dispersible film forming substances, namely, water dispersible film forming carbohydrates, or the like, and certain special types of fixing agents which are capable of converting said water soluble carbohydrates to water insoluble films, namely, antimony compounds, nevertheless, the principles relative to the preparation of emulsions as described herein are applicable to the preparation of other types of emulsions from other types of water dispersible film forming substances and fixing agents therefor which are capable of converting said substances to water insoluble films after they have been applied to a fabric or other material or article.

In preparing the various film forming emulsions of the invention for marketing, a dry blend of the water dispersible or water soluble film forming base material, the fixing agent and a solid emulsifying agent is preferably prepared. This blend requires only the addition of water and suitable stirring or mixing, preferably with heating, to produce the aqueous phase of the emulsion. Alternatively, the emulsifying agent may be added by the user. Also, the complete emulsion can be prepared as exemplified by the examples and sold as such, with or without the dye. Furthermore, the aqueous and oil phases of the emulsion may each be prepared separately and marketed as such, with or without the addition of the dye, so that they require only suitable mixing to form the complete emulsion.

Throughout the specification and claims the term "emulsion" is used to describe liquids which do not mix, such as oil and water, in which one liquid forms minute droplets suspended in the other liquid, for example, oil droplets in water, or water droplets in oil. The droplet phase of the emulsion is referred to herein as the inner or discontinuous phase, and the other phase as the outer or continuous phase. It will be observed that the emulsions specifically described in the Examples I and II are emulsions of the oil-in-water type, that is to say, they have an outer aqueous phase and an inner oil phase. In Example III the emulsion is of the water-in-oil type. If a dye or dye component is added, it normally becomes a part of the aqueous phase of the emulsion. The term "dye" is used herein to cover all types of dyes, including pigment dyes, direct dyes and acid dyes which may be either soluble or insoluble. The term "dye component" is used to describe any color component which does not have the final color which it will have after the final processing of the material being treated.

Although the invention is especially suited for the printing of textile materials, it will be understood that it may be applied in the printing of other types of materials, including paper. Emulsions prepared in accordance with the invention, with or without the addition of a color or color forming material, may be employed in coating, impregnating, sizing, finishing and otherwise treating a wide variety of materials, including woven materials, knit materials, sheet materials, board-like products, fabricated articles such as boxes, bottles, tubes and the like made from cellulose, linen, wool, asbestos, glass, cellulose esters, cellulose ethers, synthetic polyamides (Nylon), and other natural and synthetic fibers and articles fabricated therefrom.

While the invention has many special advantages in the printing of textile materials, particularly in the production of smoother prints, more even coverage, more perfect reproduction of fine lines, improved printing pastes and greater resistance to washing, the film forming emulsions of the invention also can be used for forming water resistant films on many other types of articles, objects or materials.

Having thus described the invention, what we claim as new and desire to secure by Letters Patent of the United States is:

1. A method of forming water resistant films on objects which comprises applying to said objects an emulsion containing a water immiscible phase and an aqueous phase, the aqueous phase having dispersed therein a water dispersible polyhydroxylated film forming substance capable of being converted to a less water soluble film by drying in the presence of a water insolubilizing agent, said water insolubilizing agent comprising an antimony compound active to convert said water dispersible polyhydroxylated film forming substance to a less soluble form by drying after said emulsion has been applied to said objects, and thereafter drying said film in the presence of said agent.

2. A method of forming water resistant films on various types of materials which comprises applying to said materials an emulsion having a continuous aqueous outer phase and a water immiscible inner phase, said outer phase containing a dispersion of a water dispersible polyhydroxylated film forming substance capable of being converted to a substantially water insoluble film by drying in the presence of an antimony compound active to convert said water dispersible polyhydroxylated film forming substance to a less soluble form by drying it in association with said polyhydroxylated film forming substance, and then drying said film in the presence of said antimony compound after said emulsion has been applied to said material.

3. A method of coloring materials which comprises applying to a material to be colored an emulsion containing a coloring matter, said emulsion having an outer continuous aqueous phase containing a water dispersible polyhydroxylated film forming substance convertible into a less water soluble film on said material by drying in the presence of an antimony compound active to convert said water dispersible polyhydroxylated film forming substance to a less soluble form by drying it in association with said polyhydroxylated film forming substance, and a dispersed water immiscible phase, and drying said emulsion upon said material in the presence of said antimony compound.

4. A method as claimed in claim 3 in which said fixing agent is dispersed in the aqueous phase of said emulsion.

5. A method as claimed in claim 3 in which said coloring matter is dispersed in the aqueous phase of said emulsion.

6. A method as claimed in claim 3 in which the water immiscible phase of said emulsion has dissolved therein a film forming substance which forms a substantially water insoluble film upon the removal of solvent by drying.

7. A method of textile printing which comprises printing on textile with an emulsion of printable consistency containing coloring matter and containing a continuous aqueous phase and a discontinuous water immiscible phase having substantially no solvent action on said coloring matter, said aqueous phase containing a dispersion of a water dispersible film forming carbohydrate binder convertible on the textile material into a less water soluble film by drying in the presence of an antimony compound active to convert said water dispersible film forming carbohydrate binder to a less soluble form upon drying in association therewith, and drying said printed emulsion in the presence of said antimony compound under the influence of heat.

8. A method as claimed in claim 7 in which said fixing agent is present in the aqueous phase of said emulsion.

9. A method as claimed in claim 7 in which the water immiscible phase is a volatile organic solvent containing a film forming solute which is water insoluble upon the removal of the solvent under the influence of heat.

10. A method of printing textiles which comprises printing on textiles with an emulsion of printable consistency containing coloring matter and containing a continuous aqueous phase and a discontinuous water immiscible phase having substantially no solvent action on said coloring matter, said aqueous phase containing a dispersion of a water dispersible film forming carbohydrate of the type hydrolyzable by acids to simpler molecular compounds, and an antimony compound active to convert said water dispersible film forming carbohydrate to a less soluble form by drying after printing said emulsion on said textile.

11. A method as claimed in claim 10 in which said film forming carbohydrate comprises an amylaceous substance.

12. A method as claimed in claim 10 in which said film forming carbohydrate comprises a natural gum.

13. A method as claimed in claim 10 in which said film forming carbohydrate comprises an amylaceous substance and said antimony compound comprises a water soluble pyroantimonate.

14. A method of applying a pigment dye to a textile which comprises printing on the textile with an emulsion of printable consistency containing a substantially insoluble pigment and containing an aqueous phase and a water immiscible phase having substantially no solvent action on said coloring matter, said aqueous phase containing a dispersion of a water dispersible film forming carbohydrate of the type hydrolyzable by acids to simpler molecular compounds, and an antimony compound active to convert said water dispersible film forming carbohydrate to a less soluble form by drying after printing said emulsion on said textile.

15. A method of forming water resistant films on an object which comprises applying to said object an emulsion having a continuous water immiscible outer phase and a discontinuous aqueous inner phase, said inner phase containing a dispersion of a water dispersible polyhydroxylated film forming substance capable of being converted to a substantially water insoluble film by drying in the presence of an antimony compound active to convert said water dispersible polyhydroxylated film forming substance to a less soluble form upon drying in association therewith, together with said antimony compound, and then drying said emulsion on said object.

16. A method of applying a pigment to an article which comprises applying to said article an emulsion having an outer water immiscible phase and an inner discontinuous aqueous phase, said emulsion containing a pigment, a water soluble polyhydroxylated film forming binder and a water insolubilizing agent for said binder, all in said aqueous phase, said water insolubilizing agent consisting of an antimony compound active to convert said water dispersible polyhydroxylated film forming binder to a water insoluble form and drying said emulsion upon said material.

17. The method of preparing a film forming emulsion which comprises separately preparing an aqueous phase and a water immiscible phase for said emulsion, said aqueous phase containing a dispersion of a substantially water soluble polyhydroxylated film forming binder and a water insolubilizing agent for said binder, said water insolubilizing agent consisting of an antimony compound active to convert said film forming binder to a less soluble form upon drying in association therewith emulsifying the oil phase in the aqueous phase to form an oil-in-water emulsion and then adding a coloring matter while reversing said emulsion to a water-in-oil type.

18. A method as claimed in claim 17 in which the coloring matter is dispersed in a water immiscible oil also containing an oil soluble binder.

19. A film forming emulsion comprising a water immiscible phase and an aqueous phase, the aqueous phase containing a water dispersible polyhydroxylated film forming substance capable of being converted to a water insoluble film by drying in the presence of an antimony compound active to convert said water dispersible polyhydroxylated film forming substance to a less soluble form when dried in association therewith.

20. A film forming emulsion comprising an inner discontinuous water immiscible phase and an outer continuous aqueous phase, said outer phase containing a dispersion of a water dispersible polyhydroxylated film forming substance and an antimony compound active to render said film forming substance less water soluble when said emulsion is applied and then dried.

21. An emulsion as claimed in claim 19 in which the aqueous phase contains a dye.

22. A film forming emulsion comprising an inner discontinuous water immiscible phase and an outer continuous aqueous phase, said outer continuous aqueous phase containing a dispersed water dispersible film forming carbohydrate of the type hydrolyzable by acids to simpler molecular compounds, and an antimony compound active to convert said water dispersible film forming substance to a substantially water insoluble film upon drying.

23. An emulsion as claimed in claim 22 in which the water immiscible phase is a volatile organic solvent and contains a water insoluble film forming solute.

24. A film forming emulsion comprising an outer continuous water immiscible phase and an inner discontinuous aqueous phase, said inner phase containing a dispersion of a water dispersible polyhydroxylated film forming substance and a water insolubilizing agent for said film forming substance active to render said film forming substance less water soluble when said emulsion is applied and then dried, said water insolubilizing agent being an antimony compound active to convert said water dispersible film forming carbohydrate to a less soluble form when said emulsion is applied and then dried.

25. A film forming emulsion comprising a water immiscible phase and an aqueous phase, the aqueous phase containing a water soluble polyhydroxylated film forming binder, a pigment dye and a water insolubilizing agent for said binder comprising an antimony compound capable of converting a film of said binder to a water insoluble form when the emulsion is applied and then dried, all dispersed in said aqueous phase.

26. A film forming emulsion comprising an inner discontinuous aqueous phase and an outer continuous water immiscible phase, said aqueous phase containing a dispersion of a water dispersible polyhydroxylated film forming binder and a water insolubilizing agent comprising an antimony compound active to render said binder less water soluble when said emulsion is applied and then dried, and said emulsion also containing a pigment.

27. A textile printing paste comprising an emulsion, the outer phase of which comprises a dispersion of a water dispersible polyhydroxylated film forming substance in water and an antimony compound active to convert said film forming substance to a substantially insoluble form upon drying, and the inner phase of which comprises a volatile organic solvent.

28. A printing paste as claimed in claim 27 in which a coloring matter is present in the outer aqueous phase.

29. A printing paste as claimed in claim 27 in which the volatile organic solvent phase contains a water insoluble film forming solute.

30. A textile printing composition comprising an emulsion, the inner phase of which comprises a water immiscible oil and the outer phase of which comprises an aqueous dispersion of a water dispersible film forming substance selected from the group consisting of amylaceous substances, natural gums and polyvinyl alcohol and a minor proportion of a water soluble pyroantimonate.

31. A textile printing composition as claimed in claim 30 in which the outer phase contains a pigment dye.

32. A textile printing composition as claimed in claim 30 in which the inner phase contains a water insoluble film forming solute.

33. A method of forming water resistant films on textile materials which comprises applying to said textile materials an emulsion containing a water immiscible phase and an aqueous phase, the aqueous phase having dispersed therein a water dispersible film forming substance capable of being converted to a less water soluble film by drying in the presence of a water insolubilizing agent, said water dispersible film forming substance being a water soluble polyhydroxy compound selected from the group consisting of amylaceous substances, carbohydrate gums, and polyvinyl alcohols, said water insolubilizing agent being an antimony compound at least partially soluble in water, and thereafter drying said film in the presence of said agent.

34. A method of printing textiles which comprises printing on textiles with an emulsion of printable consistency containing coloring matter and containing a continuous aqueous phase and a discontinuous water immiscible phase having substantially no solvent action on said coloring matter, said aqueous phase containing a dispersion of a polyvinyl alcohol, and an antimony compound reactive with said polyvinyl alcohol to convert it to a less soluble form when the resultant print is dried.

IRA L. GRIFFIN.
DAVE E. TRUAX.
NORMAN H. NUTTALL.